(12) United States Patent
Fujita et al.

(10) Patent No.: US 9,643,497 B2
(45) Date of Patent: May 9, 2017

(54) BICYCLE CONTROL APPARATUS

(71) Applicant: Shimano Inc., Sakai, Osaka (JP)

(72) Inventors: Junya Fujita, Osaka (JP); Makoto Usui, Osaka (JP); Taihei Nishihara, Osaka (JP)

(73) Assignee: Shimano Inc., Osaka (JP)

(*) Notice: Subject to any disclaimer, the term of this patent is extended or adjusted under 35 U.S.C. 154(b) by 111 days.

(21) Appl. No.: 14/872,504

(22) Filed: Oct. 1, 2015

(65) Prior Publication Data

US 2016/0121730 A1    May 5, 2016

(30) Foreign Application Priority Data

Oct. 31, 2014  (JP) .................................. 2014-223109

(51) Int. Cl.
  *B60L 11/18* (2006.01)
(52) U.S. Cl.
  CPC ........... *B60L 11/18* (2013.01); *Y02T 10/7005* (2013.01)
(58) Field of Classification Search
  CPC ............................. B60L 11/18; Y02T 10/7005
  See application file for complete search history.

(56) References Cited

U.S. PATENT DOCUMENTS

2014/0166385 A1*  6/2014  Arimune .................. B62M 6/45
                                                                180/206.3

FOREIGN PATENT DOCUMENTS

| EP | 1 967 446 A1 | 9/2008 |
|---|---|---|
| JP | 2002-255082 A | 9/2002 |
| JP | 2007-230411 A | 9/2007 |
| JP | 4518298 B2 | 8/2010 |
| JP | 4518300 B2 | 8/2010 |
| JP | 2011-178341 A | 9/2011 |
| JP | 2014-69689 A | 4/2014 |
| WO | 2007/077827 A1 | 7/2007 |

\* cited by examiner

*Primary Examiner* — Richard Camby
(74) *Attorney, Agent, or Firm* — Global IP Counselors, LLP

(57) ABSTRACT

A bicycle control apparatus is basically provided with a memory device and a control device. The control device is programmed with an automatic switching function and a manual switching function. The automatic switching function automatically switches an assist ratio, which is a ratio of a manual drive force to a drag force of an electric assist motor, based on a relationship between a threshold value that is stored and a reference value that is indicative of one of a bicycle traveling environment and a bicycle traveling state. The manual switching function switches the assist ratio based on a manual operation. The control device is further programmed to update the threshold value is updated based on the reference value when switching the assist ratio by the manual switching function.

20 Claims, 6 Drawing Sheets

BICYCLE CONTROL APPARATUS

CROSS-REFERENCE TO RELATED APPLICATIONS

This application claims priority to Japanese Patent Application No. 2014-223109, filed on Oct. 31, 2014. The entire disclosure of Japanese Patent Application No. 2014-223109 is hereby incorporated herein by reference.

BACKGROUND

Field of the Invention

This invention generally relates to a bicycle control apparatus. More specifically, the present invention relates to a bicycle control apparatus that controls an electric assist motor provides a drive force that assists a manual drive force of a rider.

Background Information

Some bicycles are provided with an electric assist motor that provides a drive force that assists a manual drive force of a rider. This type of bicycle is sometimes called an electric assist bicycle. One example of an electric assist bicycle is disclosed in Japanese Patent No. 3,974,974 B2, which is such an example, comprises a bicycle control apparatus for switching the assist ratio, which is the ratio of the manual drive force to the drive force of the electric assist motor. This bicycle control apparatus switches the assist ratio based on the road surface gradient, which is one example of a traveling environment that is stored in advance.

SUMMARY

Generally, the present disclosure is directed to various features of a bicycle control apparatus.

In electric assist bicycles, there are situations in which an expected timing for switching an assist ratio will be different for each rider, even when the traveling environment, etc. of the bicycle is the same. In the case of the bicycle control apparatus disclosed in Japanese Patent No. 3,974,974 B2, the assist ratio is switched by the bicycle control apparatus according to a predetermined rule without considering the intentions of the rider. For this reason, there is room for improvement regarding having the behavior of the bicycle reflect the intent of the rider. Here, one objective is to provide a bicycle control apparatus that automatically switches the assist ratio. However, it has been discovered that a similar problem also exists in a bicycle control apparatus that automatically switches the gear ratio.

One object of the present invention is to provide a bicycle control apparatus in which the intent of the rider is easily reflected in the behavior of the bicycle.

In view of the state of the known technology and in accordance with a first aspect of the present disclosure, a bicycle control apparatus is provided that basically comprises a memory device and a control device. The control device is programmed with an automatic switching function and a manual switching function. The automatic switching function automatically switches an assist ratio, which is a ratio of a manual drive force to a drag force of an electric assist motor, based on a relationship between a threshold value that is stored and a reference value that is indicative of one of a bicycle traveling environment and a bicycle traveling state. The manual switching function switches the assist ratio based on a manual operation. The control device is further programmed to update the threshold value is updated based on the reference value when switching the assist ratio by the manual switching function.

In accordance with a second aspect of the present invention, the bicycle control apparatus according to the first aspect is configured so that the reference value is a value indicative of a road surface gradient.

In accordance with a third aspect of the present invention, the bicycle control apparatus according to the first aspect is configured so that the reference value is a value indicative of wind force.

In accordance with a fourth aspect of the present invention, the bicycle control apparatus according to the first aspect is configured so that the reference value is a value indicative of resistance of a road surface.

In accordance with a fifth aspect of the present invention, the bicycle control apparatus according to the first aspect is configured so that the reference value is a value indicative of a bicycle travel distance.

In accordance with a sixth aspect of the present invention, the bicycle control apparatus according to the first aspect is configured so that the reference value is a value indicative of a bicycle load weight.

In accordance with a seventh aspect of the present invention, the bicycle control apparatus according to the first aspect is configured so that the reference value is a value indicative of the manual drive force.

In accordance with an eighth aspect of the present invention, the bicycle control apparatus according to the first aspect is configured so that the automatic switching function of the control device programmed is to automatically switch the assist ratio based on a relationship between a plurality of types of reference values and a plurality of threshold values that correspond to each of the reference values, and the plurality of types of reference values comprise at least two of the following: a value indicative of a road surface gradient, a value indicative of wind force, a value indicative of a resistance of a road surface, a value indicative of a bicycle travel distance, a value indicative of a bicycle load weight, and a value indicative of the manual drive force.

In accordance with a ninth aspect of the present invention, the bicycle control apparatus according to any one of the first to eighth aspects is configured so that the automatic switching function of the control device programmed is to use an increase threshold value as the threshold value for switching the assist ratio when the drive force of the electric assist motor is increased with respect to the manual drive force, the increase threshold value is updated based on the reference value when switching the assist ratio by the manual switching function so that the drive force of the electric assist motor is increased with respect to the manual drive force. The automatic switching function of the control device programmed is to use a decrease threshold value as the threshold value for switching the assist ratio when the drive force of the electric assist motor is decreased with respect to the manual drive force, the decrease threshold value is updated based on the reference value when switching the assist ratio by the manual switching function so that the drive force of the electric assist motor is decreased with respect to the manual drive force.

In accordance with a tenth aspect of the present invention, the bicycle control apparatus according to any one of the first to ninth aspects is configured so that the reference value is stored each time the assist ratio is switched by the manual switching function, and the threshold value is updated based on a plurality of the reference values that are stored.

In accordance with an eleventh aspect of the present invention, the bicycle control apparatus according to the tenth aspect is configured so that the reference values excludes singular points in the plurality of the reference values that are stored and used for updating the threshold value.

In accordance with a twelfth aspect of the present invention, the bicycle control apparatus according to the tenth or eleventh aspect is configured so that the automatic switching function of the control device programmed is to use a specific reference value as the reference value at which the assist ratio is estimated as likely to be switched by the manual switching function. The specific reference value is specified based on the plurality of the reference values, and the threshold value is updated based on the specific reference value.

In accordance with a thirteenth aspect of the present invention, the bicycle control apparatus according to the twelfth aspect is configured so that the increase threshold value is set in an area in which a bicycle load weight is low, within an area of the reference value that is specified by the specific reference value.

In accordance with a fourteenth aspect of the present invention, the bicycle control apparatus according to the twelfth or thirteenth aspect is configured so that the decrease threshold value is set in an area in which a bicycle load weight is high, within an area of the reference value that is specified by the specific reference value.

In accordance with a fifteenth aspect of the present invention, the bicycle control apparatus according to the first aspect is configured so that the control device is further programmed is to use a plurality of types of the reference values. The reference value is stored each time the assist ratio is switched by the manual switching function. The automatic switching function of the control device programmed is to use a specific reference value as the reference value at which the assist ratio is estimated as likely to be switched by the manual switching function. The specific reference value is determined based on the plurality of the reference values for each of the plurality of types of the reference values. The plurality of the threshold values that correspond to each of the plurality of types of reference values are updated based on the specific reference value that corresponds to that type of reference value.

In accordance with a sixteenth aspect of the present invention, the bicycle control apparatus according to the first aspect is configured so that the control device is further programmed is to use a plurality of types of the reference values. The automatic switching function of the control device programmed is to switch the assist ratio using the threshold value with which a mode switching condition for switching the assist mode is estimated to be most quickly satisfied, from among the plurality of the threshold values that correspond to each of the plurality of types of the reference values.

In accordance with a seventeenth aspect of the present invention, the bicycle control apparatus according to the first aspect is configured so that the control device is further programmed is to use a plurality of types of the reference values. The automatic switching function of the control device programmed is to determine a compound value by combining the plurality of types of the reference values, and the assist ratio is switched based on a relationship between a stored compound threshold value and the compound value.

In accordance with an eighteenth aspect of the present invention, the bicycle control apparatus according to any one of the first to seventeenth aspects is configured so that the threshold value is updated based on the reference value when variability in the reference value over a period, from when the assist ratio is switched by the manual switching function to when a prescribed time has elapsed, is within a prescribed range.

In accordance with a nineteenth aspect of the present invention, the bicycle control apparatus according to any one of the first to eighteenth aspects is configured so that the threshold value is updated based on the reference value when a bicycle travel distance has reached a prescribed travel distance.

In accordance with a twentieth aspect of the present invention, a bicycle control apparatus basically comprises a memory device and a control device. The control device is programmed with an automatic switching function and a manual switching function. The automatic switching function automatically switches a gear ratio of a transmission based on a relationship between a stored threshold value and a reference value that is indicative of one of a bicycle traveling environment and a bicycle traveling state. The manual switching function switches the gear ratio based on a manual operation. The control device is further programmed to update the threshold value based on the reference value when switching the gear ratio by the manual switching function, and the reference value comprises at least one of: a value indicative of a road surface gradient, a value indicative of wind force, a value indicative of resistance of the road surface, a value indicative of the bicycle travel distance, a value indicative of a bicycle load weight, and a value indicative of the manual drive force.

Also other objects, features, aspects and advantages of the disclosed bicycle control apparatus will become apparent to those skilled in the art from the following detailed description, which, taken in conjunction with the annexed drawings, discloses one embodiment of the bicycle control apparatus.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
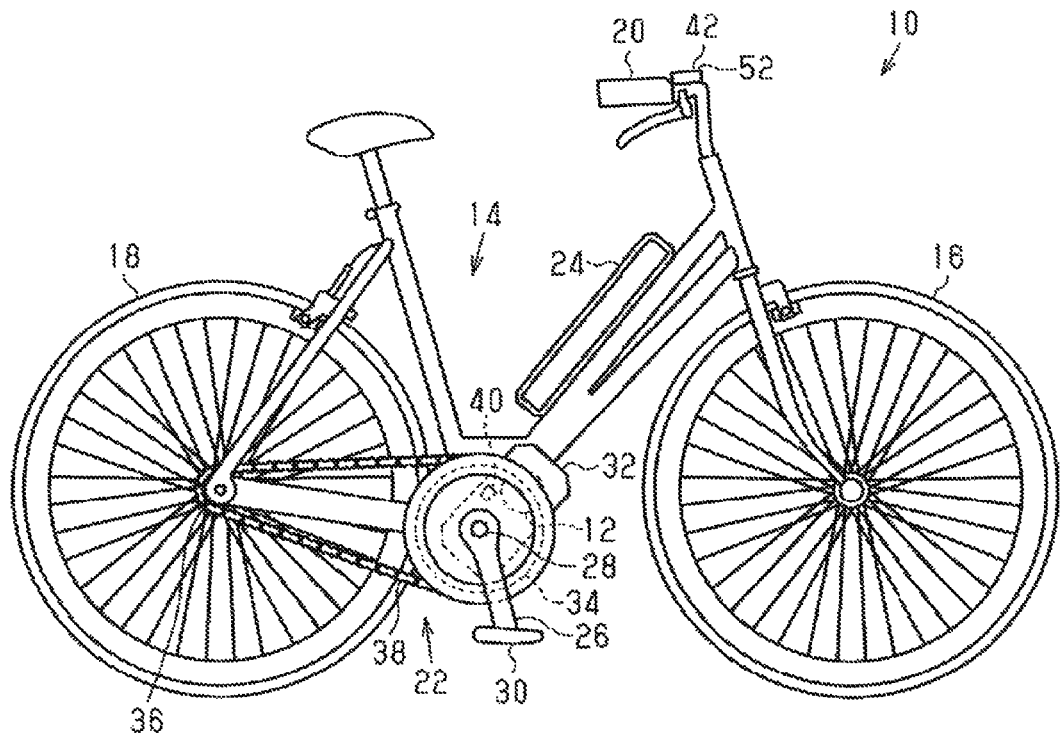
FIG. 1 is a side elevational view of a bicycle that is equipped with a bicycle control apparatus in accordance with one illustrated embodiment.

Referring initially to FIG. 1, a bicycle 10 is illustrated that is equipped with an electric assist motor 12 (hereinafter referred to as "motor 12") that is controlled by a bicycle control apparatus in accordance with a first embodiment. The motor 12 assists the manual drive force of a rider. Thus, the bicycle 10 is an electrically assisted bicycle. The bicycle 10 further comprises a frame 14, a front wheel 16 and a rear wheel 18. The frame 14 forms a main body of the bicycle 10. The front wheel 16 and the rear wheel 18 are rotatably attached to the frame 14. The bicycle 10 further comprises a handlebar 20, a drive mechanism 22 and a battery 24. The handlebar 20 is operated to change the orientation of the front wheel 16. The drive mechanism 22 is configured for transmitting the drive force to the rear wheel 18. The battery 24 is electrically connected to the drive mechanism 22 for supplying electrical power to the drive mechanism 22. In the first illustrated embodiment, for example, the battery 24 is attached to the frame 14.

The drive mechanism 22 comprises a pair of crank arms 26, a crankshaft 28 to which is coupled the pair of crank arms 26, a pair of pedals 30 that are rotatably attached to the crank arms 26, and a drive unit 32 that is detachably fixed and attached to the frame 14. The crankshaft 28 is rotatably attached to the drive unit 32. A monitor 12 is disposed inside of the drive unit 32.

The drive mechanism 22 further comprises a front sprocket 34 that is coupled with the crankshaft 28 via a one-way clutch (not diagrammed), a rear sprocket 36 that is rotatably attached around an axle of the rear wheel 18, and a chain 38 that is wound onto the front sprocket 34 and the rear sprocket 36. The drive mechanism 22 further comprises the motor 12. The motor 12 is, for example, an electric motor. An output shaft of the motor 12 is connected to a speed reducing mechanism (diagram omitted). The speed receding mechanism is, for example, a plurality of gears.

If a manual drive force for rotating the crank arm 26 forward is input to the pedal 30, the crank arm 26 and the crankshaft 28 integrally rotate forward with respect to the frame 14, the rotation of the crankshaft 28 is transmitted to the front sprocket 34, and the rotation of the front sprocket 34 is transmitted to the rear sprocket 36 and the rear wheel 18 by the chain 38. Meanwhile, if the manual drive force for rotating the crank arm 26 and the crankshaft 28 backward is input to the pedal 30, the rotation of the crankshaft 28 is not transmitted to the front sprocket 34.

The motor 12 is driven according to the manual drive force. When the motor 12 is driven, the rotation of the motor 12 is decelerated by the speed reducing mechanism, and the output of the speed reducing mechanism is transmitted to the front sprocket 34. For this reason, the manual drive force of the rider for rotating the crank arm 26 is assisted by the drive force of the motor 12.

Figure 2:
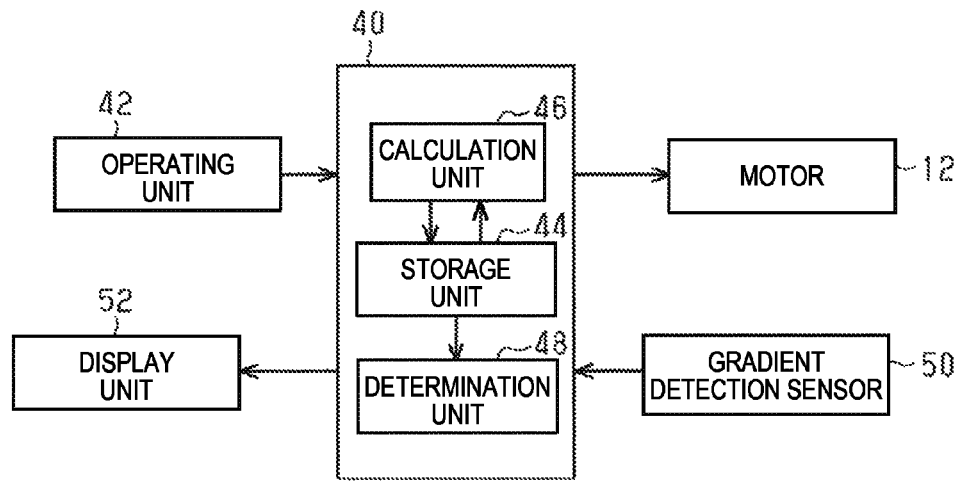
FIG. 2 is a block view of a bicycle in FIG. 1.

FIG. 2 shows the configuration of an electrical system of the bicycle 10 (refer to FIG. 1). The bicycle 10 further comprises a control device 40, which is a bicycle control apparatus for controlling various bicycle electric components including the drive mechanism 22, and an operating unit 42 for outputting an operation signal to the control device 40. The control device 40 selects one assist mode from among a plurality of assist modes that are prepared in advance or an OFF mode, based on the traveling environment and the traveling state of the bicycle 10, as well as a manual operation, etc., which is an operation of the operating unit 42. The control device 40 comprises a microcomputer having a processor with one or more control programs (software) stored in a storage unit 44 (at least one memory device). The storage unit 44 also stores various operational data that is detected and/or calculated.

In the assist mode, an assist ratio, which is a ratio of the manual drive force to the drive force of the motor 12, is determined by adjusting the drive force of the motor 12. In a bicycle 10 in which the assist mode and the assist ratio are associated, the assist ratio is switched by the assist mode being switched, and the drive force of the motor 12 is increased or decreased with respect to the manual drive force. In the OFF mode, the control device 40 does not allow the motor 12 of the drive mechanism 22 to output the drive force.

The assist ratios corresponding to each assist mode are different from each other. Examples of the plurality of assist modes include a high mode, a normal mode, a low mode, and an eco-mode. The drive force of the motor 12 with respect to the manual drive force in each assist mode becomes smaller in the order of the high mode, the normal mode, the low mode, and the eco-mode.

In addition to the storage unit 44 mentioned above, the control device 40 further comprises a calculation unit 46 that conducts calculations based on the data, etc. stored in the storage unit 44, and a determination unit 48 that determines whether a switching condition for switching the assist mode (hereinafter referred to as the "mode switching condition") is satisfied. The mode switching condition comprises a first mode switching condition for increasing the drive force of the motor 12 with respect to the manual drive force (refer to FIG. 4) and a second mode switching condition for reducing the drive force of the motor 12 with respect to the manual drive force (refer to FIG. 6).

The control device 40 comprises an automatic switching function and a manual switching function. The automatic switching function comprises the storage unit 44, the calculation unit 46, the determination unit 48, and a manual switching function. The automatic switching function is a function that automatically switches the assist ratio based on the tilt of the bicycle 10, that is, a function to switch the assist ratio independent of a manual operation. The manual switching function is a function to switch the assist ratio based on a manual operation of the operating unit 42.

An operation of the control device 40 based on the automatic switching function includes an operation to switch the assist ratio based on the relationship between a reference value, which is a value indicative of the traveling environment or the traveling state of the bicycle 10, and a threshold value that is stored in the storage unit 44. The control device 40 stores the reference value when switching the assist ratio, based on the manual operation of the operating unit 42, to the storage unit 44, updates the threshold value that is stored in the storage unit 44 based on the stored reference value, and uses the updated threshold value in the automatic switching function.

The bicycle 10 further comprises a gradient detection sensor 50 that is connected to the control device 40 and a display unit 52. The gradient detection sensor 50 and the display unit 52 are electric components. An example of the gradient detection sensor 50 is an angle sensor, which is attached to the frame 14 (refer to FIG. 1). An angle sensor is realized by, for example, an acceleration sensor. The gradient detection sensor 50 is preferably attached to a portion of the frame 14 that is not easily affected by the behavior of the bicycle 10. The gradient detection sensor 50 detects the road surface gradient, which is one example of a reference value. The gradient detection sensor 50 outputs gradient information, which is information regarding the detected gradient, to the control device 40. The gradient information includes a value indicative of the gradient. The display unit 52 displays information corresponding to the manual operation in response to a command signal from the control device 40.

Figure 3:
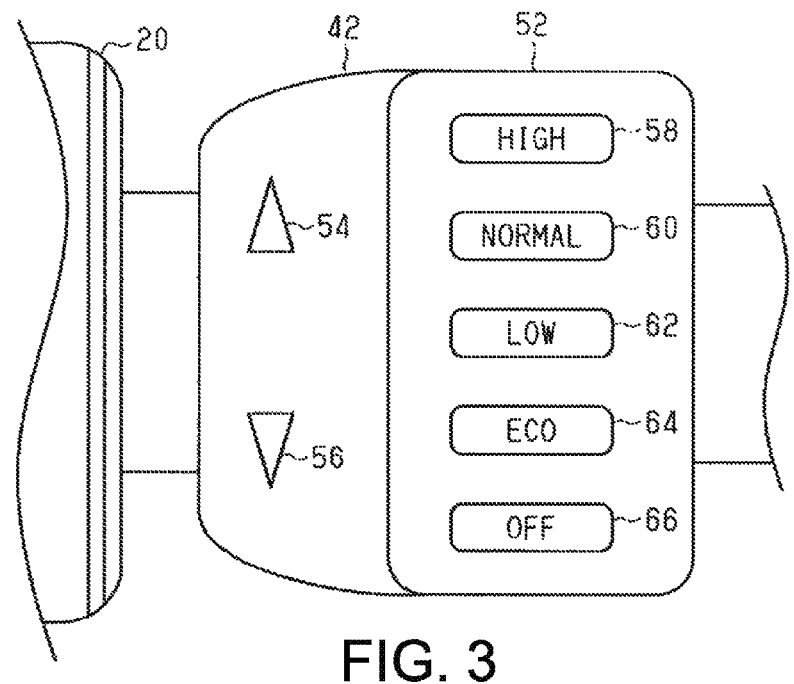
FIG. 3 is a plan view of an operating unit and a display unit in FIG. 1.

FIG. 3 shows one example of the operating unit 42 and the display unit 52. The operating unit 42 and the display unit 52 are integrally formed and attached to the handlebar 20. For example, the operating unit 42 can be a button that includes a first operating switch 54 and a second operating switch 56.

The first operating switch 54 and the second operating switch 56 output an operation signal to the control device 40 (refer to FIG. 2) whenever they have been operated. The control device 40 switches the assist mode so that the drive force of the motor 12 with respect to the manual drive force is increased when receiving an operation signal that is output from the first operating switch 54. The control device 40 switches the assist mode so that the drive force of the motor 12 with respect to the manual drive force is decreased when receiving an operation signal that is output from the second operating switch 56.

The display unit 52 comprises a plurality of lamps that are turned on or turned off based on a command signal from the control device 40. One example of the plurality of lamps is an LED (Light Emitting Diode) lamp, which includes a first lamp 58, a second lamp 60, a third lamp 62, a fourth lamp 64, and a fifth lamp 66. The first lamp 58 is turned on when a high mode is selected. The second lamp 60 is turned on when a normal mode is selected. The third lamp 62 is turned on when a low mode is selected. The fourth lamp 64 is turned on when an eco-mode is selected. The fifth lamp 66 is turned on when an off mode is selected.

Figure 4:
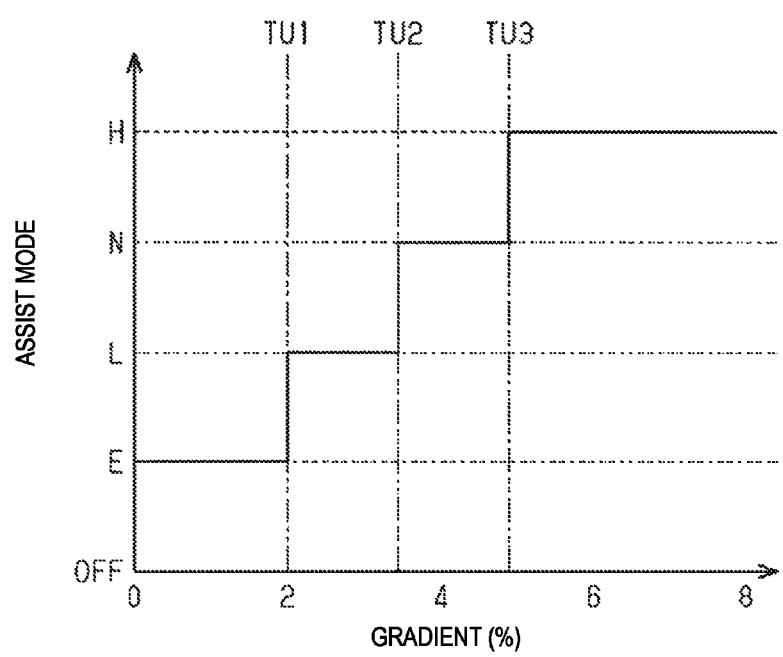
FIG. 4 is a map showing one example of a mode switching condition.

FIG. 4 shows one example of a first mode switching condition. The first mode switching condition represents the relationship between the road surface gradient and an increase threshold value, which is a threshold value for increasing the drive force of the motor 12 with respect to the manual drive force. The storage unit 44 (refer to FIG. 2) stores a plurality of increase threshold values. For example, plural increase threshold values can comprise a first increase threshold value TU1, a second increase threshold value TU2, and a third increase threshold value TU3. In FIG. 4, each of the increase threshold values TU1-TU3 is represented by a chained, double-dashed line.

The determination unit 48 (refer to FIG. 2) determines whether a first mode switching condition has been satisfied, based on the relationship between the gradient information that is input from the gradient detection sensor 50 (refer to FIG. 2) and each of the increase threshold values TU1-TU3, as described below.

When the eco-mode is selected, and when the road surface gradient that is indicated by the gradient information changes from a size that is less than the first increase threshold value TU1 to a size that is greater than or equal to the first increase threshold value TU1, the determination unit 48 determines that the first mode switching condition has been satisfied, and the control device 40 switches the assist mode from the eco-mode to the low mode.

When the low mode is selected, and when the road surface gradient that is indicated by the gradient information changes from a size that is less than the second increase threshold value TU2 to a size that is greater than or equal to the second increase threshold value TU2, the determination unit 48 determines that the first mode switching condition has been satisfied, and the control device 40 switches the assist mode from the low mode to the normal mode.

When the normal mode is selected, and when the road surface gradient that is indicated by the gradient information changes from a size that is less than the third increase threshold value TU3 to a size that is greater than or equal to the third increase threshold value TU3, the determination unit 48 determines that the first mode switching condition has been satisfied, and the control device 40 switches the assist mode from the normal mode to the high mode.

The control device 40 updates each of the increase threshold values TU1-TU3 based on the gradient information. Here, a method for updating the second increase threshold value TU2 will be described in order to represent the increase threshold values TU1-TU3. The method for updating the first increase threshold value TU1 and the third increase threshold value TU3 is substantially the same as the method for updating the second increase threshold value TU2.

Each time the assist mode is switched from the low mode to the normal mode based on an operation of the first operating switch 54 (refer to FIG. 3), the control device 40 stores data related to the gradient information (hereinafter referred to as the "data at the time of mode switching") obtained at that time in the storage unit 44. When the total amount of data at the time of mode switching reaches a prescribed amount, the calculation unit 46 (refer to FIG. 2) updates the second increase threshold value TU2 according to the following procedure.

Figure 5:
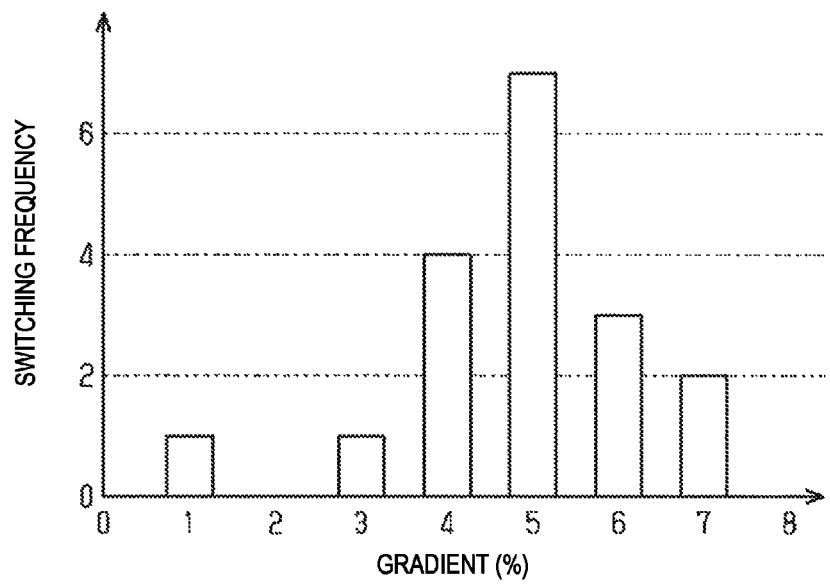
FIG. 5 is a graph showing one example of a relationship between a mode switching frequency and a road surface gradient.

The calculation unit 46 first assesses the relationship between the gradient information and the frequency at which the assist mode is switched (hereinafter referred to as the "mode switching frequency"). FIG. 5 shows one example thereof. The calculation unit 46 next removes the singular points from the relationship. Singular points are, for example, data included in a prescribed area within all of the data that have been referenced. A prescribed area is, for example, the upper few % and the lower few % of all of the data. The upper few % is, for example, 1%, and the lower few % is, for example, 1%.

The calculation unit 46 next identifies a specific reference value, which is the gradient information with the highest mode switching frequency. In the example shown in FIG. 5, the gradient information indicating a 5% gradient is the specific reference value. When the actual road surface gradient increases across the specific reference value, the assist mode will likely be switched as a result of a manual operation.

The calculation unit 46 (refer to FIG. 2) next sets a new second increase threshold value TU2 in an area that is less than or equal to the specific reference value. The new second increase threshold value TU2 is preferably set in an area in which the pedaling load of the bicycle 10 is less than the specific reference value, that is, an area that is less than the specific reference value. Switching the assist ratio a little earlier than the rider intends is possible by setting the new second increase threshold value TU2 in an area that is less than the specific reference value. The new second increase threshold value TU2 is obtained by, for example, multiplying a prescribed coefficient that is less than 1 by the specific reference value or by subtracting a prescribed value from the specific reference value. The new second increase threshold value TU2 may be set in an area with the maximum gradient, within an area that is a prescribed percentage from the lower end of the gradient in the data at the time of mode switching, excluding the singular points. A prescribed percentage is, for example, 20%-30%. The lower limit of the second increase threshold value TU2 is greater than the first increase threshold value TU1. The storage unit 44 (refer to FIG. 2) updates the stored second increase threshold value TU2 to the new second increase threshold value TU2. In this way, the control device 40 (refer to FIG. 2) updates each of the increase threshold values TU1-TU3 based on the gradient information.

Figure 6:
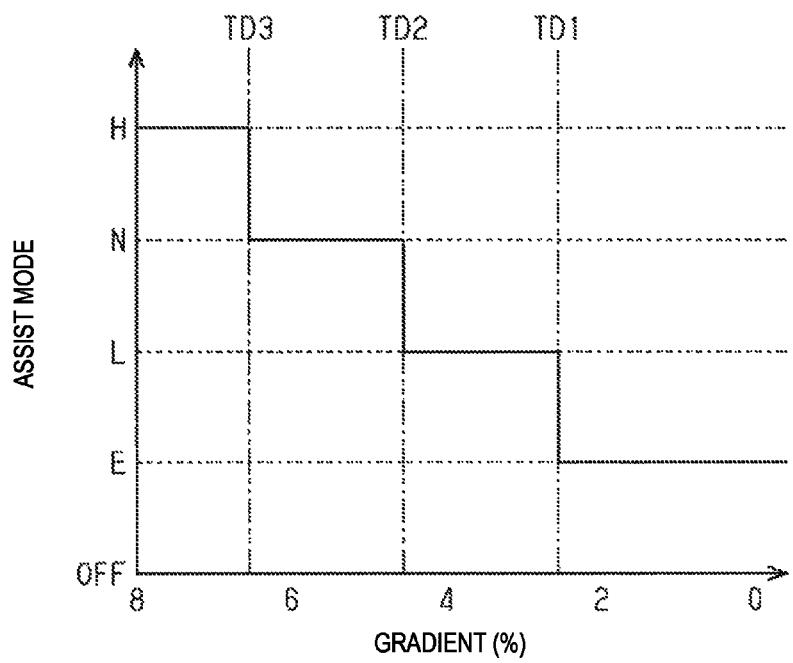
FIG. 6 is a map showing one example of a mode switching condition.

FIG. 6 shows one example of a second mode switching condition. The second mode switching condition represents the relationship between the road surface gradient and a decrease threshold value, which is a threshold value for decreasing the drive force of the motor 12 with respect to the manual drive force. The storage unit 44 (refer to FIG. 2) stores a plurality of decrease threshold values. For example, plural decrease threshold values can comprise a first decrease threshold value TD1, a second decrease threshold value TD2, and a third decrease threshold value TD3. In FIG. 6, each of the decrease threshold values TD1-TD3 is represented by a chained, double-dashed line.

The determination unit 48 (refer to FIG. 2) determines whether a second mode switching condition has been satisfied, based on the relationship between the gradient information that is input from the gradient detection sensor 50 (refer to FIG. 2) and each of the decrease threshold values TD1-TD3, as described below.

When the high mode is selected, and when the road surface gradient that is indicated by the gradient information changes from a size that is greater than or equal to the third decrease threshold value TD3 to a size that is less than the third decrease threshold value TD3, the determination unit 48 determines that the second mode switching condition has been satisfied, and the control device 40 switches the assist mode from the high mode to the normal mode.

When the normal mode is selected, and when the road surface gradient that is indicated by the gradient information changes from a size that is greater than or equal to the second decrease threshold value TD2 to a size that is less than the second decrease threshold value TD2, the determination unit 48 determines that the second mode switching condition has been satisfied, and the control device 40 switches the assist mode from the normal mode to the low mode.

When the low mode is selected, and when the road surface gradient that is indicated by the gradient information changes from a size that is greater than or equal to the first decrease threshold value TD1 to a size that is less than the first decrease threshold value TD1, the determination unit 48 determines that the second mode switching condition has been satisfied, and the control device 40 switches the assist mode from the low mode to the eco-mode.

For example, when the assist mode is switched based on an operation of the operating unit 42 (refer to FIG. 3), the control device 40 does not automatically switch the assist mode until one mode switching condition, either the first mode switching condition or the second mode switching condition, has been satisfied.

The control device 40 updates each of the decrease threshold values TD1-TD3 based on the gradient information. Here, a method for updating the second decrease threshold value TD2 will be described in order to represent the decrease threshold values TD1-TD3. The method for updating the first decrease threshold value TD1 and the third decrease threshold value TD3 is substantially the same as the method for updating the second decrease threshold value TD2.

Each time the assist mode is switched from the normal mode to the low mode based on an operation of the second operating switch 56 (refer to FIG. 3), the control device 40 stores data at the time of mode switching in the storage unit 44. When the total amount of the data at the time of mode switching reaches a prescribed amount, the calculation unit 46 (refer to FIG. 2) updates the second decrease threshold value TD2 according to the following procedure.

Figure 7:
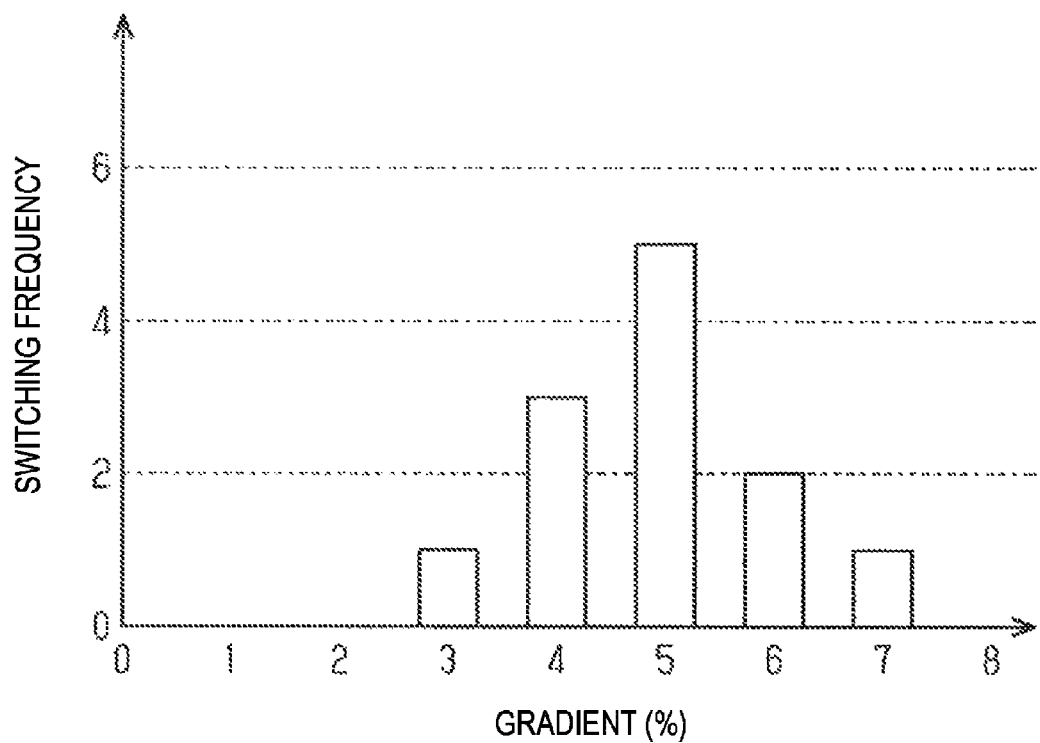
FIG. 7 is a graph showing one example of a relationship between a mode switching frequency and a road surface gradient.

The calculation unit 46 first assesses the relationship between the gradient information and the mode switching frequency. FIG. 7 shows one example thereof. The calculation unit 46 next removes the singular points from the relationship. The calculation unit 46 then identifies a specific reference value. In the example shown in FIG. 7, the gradient information indicating a 5% gradient is the specific reference value. When the actual road surface gradient decreases across the specific reference value, the assist mode will likely be switched based on a manual operation.

Next, the calculation unit 46 (refer to FIG. 2) sets a new second decrease threshold value TD2 in an area that is greater than or equal to the specific reference value. The new second decrease threshold value TD2 is preferably set in an area in which the pedaling load of the bicycle 10 is higher than the specific reference value, that is, an area that is greater than the specific reference value. Switching the assist ratio a little earlier than the rider intends is possible by setting the new second decrease threshold value TD2 in an area that is greater than the specific reference value. The new second decrease threshold value TD2 is obtained by, for example, multiplying a prescribed coefficient that is greater than or equal to 1 and less than 2 by the specific reference value or by adding a prescribed value to the specific reference value. The new second decrease threshold value TD2 may be set to an area of the minimum gradient, which is within an area that is a prescribed percentage away from the higher end of the gradient in the data at the time of mode switching, excluding the singular points. A prescribed percentage is, for example, 20%-30%. The upper limit of the second decrease threshold value TD2 is less than the third decrease threshold value TD3. The storage unit 44 (refer to FIG. 2) updates the stored second decrease threshold value TD2 to the new second decrease threshold value TD2. In this way, the control device 40 (refer to FIG. 2) updates each of the decrease threshold values TD1-TD3 based on the gradient information.

Figure 8:
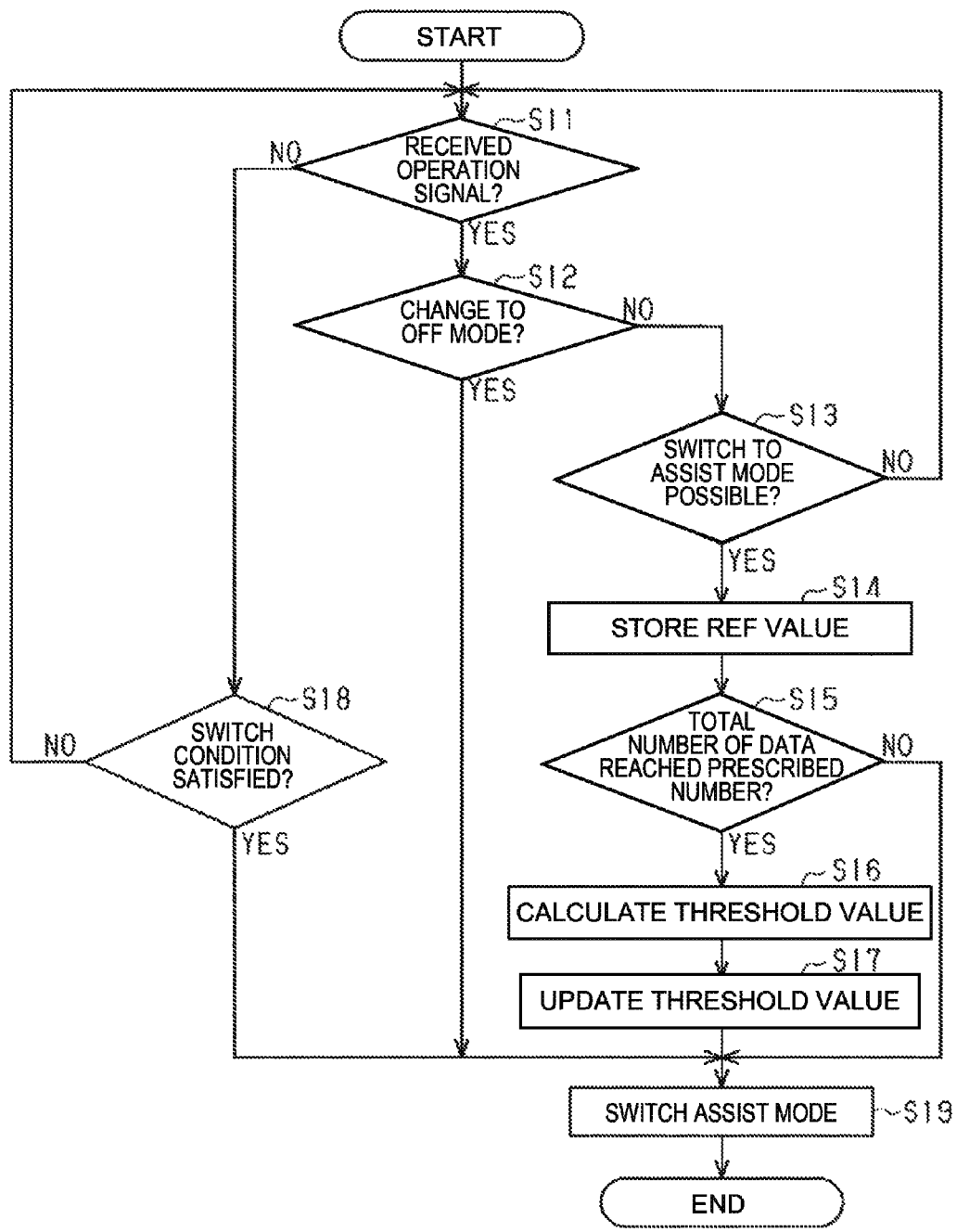
FIG. 8 is a flowchart for a control that is executed by the control device in FIG. 1.

FIG. 8 is a flowchart for a control that is executed by the control device 40. The control device 40 begins the operation of FIG. 8 when the assist mode is switched from the off mode to another mode or, if the assist mode is set to a mode besides the off mode, when the power is turned on and the control device 40 is activated.

The control device 40 determines whether or not an operation signal has been received from the first operating switch 54 or the second operating switch 56 in step S11. If an operation signal has been received, the operation that is executed by the control device 40 proceeds to step S12. If an operation signal has not been received, the operation that is executed by the control device 40 proceeds to step S18.

The control device 40 determines whether or not to change the assist mode to the off mode in step S12. If a determination is made to change the assist mode to the off mode, the operation that is executed by the control device 40 proceeds to step S19. If a determination is made not to change the assist mode to the off mode, the operation that is executed by the control device 40 proceeds to step S13.

The control device 40 determines whether or not switching the assist mode is possible in step S13. If a determination is made that switching the assist mode is possible, the operation that is executed by the control device 40 proceeds to step S14. If a determination is made that switching the assist mode is not possible, the operation that is executed by the control device 40 proceeds to step S11. The control device 40 determines that switching the assist mode is not possible in step S13 if the first operating switch 54 is operated when the high mode is selected.

The control device 40 switches the assist mode based on an operation signal and stores the data related to the gradient information at that time to the storage unit 44 in step S14. The data related to the gradient information is stored to the storage unit 44 every time the assist mode is switched.

The control device 40 determines whether or not the total amount of data related to the gradient information has reached a prescribed amount in step S15. The total amount of data related to the gradient information includes the total amount of data related to the gradient information when switching from the eco-mode to the low mode, the total amount of data related to the gradient information when switching from the low mode to the normal mode, the total amount of data related to the gradient information when switching from the normal mode to the high mode, the total amount of data related to the gradient information when switching from the high mode to the normal mode, the total amount of data related to the gradient information when switching from the normal mode to the low mode, and the total amount of data related to the gradient information when switching from the low mode to the eco-mode; the control device 40 counts the total amount of this data separately. The control device 40 determines whether or not the total amount of data of one of the total amounts of data described above has reached a prescribed amount in step S15. If the total amount of data related to the gradient information has reached a prescribed amount, the operation that is executed by the control device 40 proceeds to step S16. If the total amount of data related to the gradient information has not reached a prescribed amount, the operation that is executed by the control device 40 proceeds to step S19.

The control device 40 calculates a new increase threshold value or a new decrease threshold value based on data related to the gradient information using the calculation unit 46 in step S16. The control device 40 updates the increase threshold value to a new increase threshold value or a new decrease threshold value that is calculated by the calculation unit 46 and stores this in the storage unit 44 in step S17.

The control device 40 determines whether or not the mode switching condition has been satisfied with the determination unit 48 in step S18. If the mode switching condition has been satisfied, the operation that is executed by the control device 40 proceeds to step S19. If the mode switching condition has not been satisfied, the operation that is executed by the control device 40 proceeds to step S11.

The control device 40 switches the assist mode by a manual operation or based on the mode switching condition in step S19. The control device 40 repeats the operations of step S11 to step S19 until a determination is made to change the assist mode to the off mode in step S12 and the assist mode is switched to the off mode or until the power is turned off.

The action of the bicycle 10 is described with reference to FIG. 2. When riding a bicycle 10 (refer to FIG. 1) and traveling on a slope, a rider changes the drive force of the motor 12 with respect to the manual drive force by manually operating the first operating switch 54 or the second operating switch 56 depending on the pedaling load.

Even though there is variability between each rider, the timing at which the rider operates each of the operating switches 54 and 56 when the bicycle 10 is traveling on a slope is correlated with the gradient of the slope. This is related to the fact that the gradient of the slope is correlated with the load on the rider.

For this reason, the gradient of a slope for which the mode switching frequency of the first operating switch 54 is the highest can be assumed to be the gradient at which the rider expects an increase in the drive force of the motor 12 with respect to the manual drive force when the rider travels on a slope with a bicycle 10. Additionally, the gradient of a slope for which the mode switching frequency of the second operating switch 56 is the highest can be assumed to be the gradient at which the rider expects a decrease in the drive force of the motor 12 with respect to the manual drive force when the rider travels on a slope with a bicycle 10.

A control that that considers these matters is built into the control device 40. In this control, a specific reference value, which is gradient information with the highest mode switching frequency, is specified, and the specific reference value is used to predict the timing at which the assist mode is expected to be switched, based on the mode switching condition. Then, since the threshold value is updated with reference to the specific reference value, switching the assist mode at a timing that is expected by the rider when the bicycle 10 is traveling on a slope is facilitated. In this way, according to a bicycle 10 that is equipped with the control device 40, the intent of the rider is easily reflected in the behavior of the bicycle 10. This contributes to providing a comfortable traveling environment for the rider.

According to the first embodiment, the following effects can be obtained.

(1) The control device 40 updates the threshold value based on a plurality of data related to the gradient information. For this reason, the intent of the rider is better reflected.

(2) The control device 40 updates the threshold value based on data related to the gradient information, excluding the singular points. For this reason, for example, even if an erroneous operation of the operating unit 42 is reflected in the data related to the gradient information, the updated threshold value is not likely to depart from the intent of the rider.

(3) The control device 40 sets new increase threshold values TU1-TU3 in an area that is less than the specific reference value. For this reason, the assist mode is switched so that the drive force of the motor 12 with respect to the manual drive force is increased before a time at which the rider will likely operate the first operating switch 54, accompanying an increase in the road surface gradient. That is, the assist mode is switched before the rider enters a position to operate the first operating switch 54. For this reason, the assist mode is switched at approximately the expected time even if the rider does not make the switch to the assist mode. Accordingly, a more comfortable traveling environment is provided to the rider.

(4) The control device 40 sets new decrease threshold values TD1-TD3 in an area that is greater than the specific reference value. For this reason, an effect similar to the effect of (3) described above can be obtained even when the road surface gradient decreases.

Second Embodiment

The bicycle control apparatus according to the second embodiment differs from the bicycle control apparatus according to the first embodiment in the points described below and comprises configurations that are substantially same as the bicycle control apparatus according to the first embodiment in the other points. In the description of the bicycle control apparatus according to the second embodiment, the same reference codes are given to the configurations that are shared with the bicycle control apparatus according to the first embodiment, and some or all of the descriptions for those configurations have been omitted.

The bicycle 10 further comprises a wind force sensor (not diagrammed), which is an electric component that is connected to the control device 40. The wind force sensor is attached to the frame 14 or the handlebar 20. The wind force sensor detects the wind force, which is one example of a reference value. The wind force sensor outputs the wind force information, which is information regarding the detected wind force, to the control device 40. The wind force information includes a value indicative of the wind force.

The control device 40 determines a compound value by combining a plurality of types of reference values and switches the assist ratio based on the relationship between the stored compound threshold value and the compound value. The control device 40 calculates the compound value by, for example, combining the gradient information and the wind force information. The compound value is expressed as the load level of the bicycle 10.

The control device 40 causes the determination unit 48 to further determine whether the mode switching condition has been satisfied based on the relationship between the compound value and the compound threshold value. The mode switching condition further includes a third mode switching condition (refer to FIG. 9) for increasing the drive force of the motor 12 with respect to the manual drive force, based on the relationship between the compound value and the compound threshold value, as well as a fourth mode switching condition (not diagrammed) for reducing the drive force of the motor 12 with respect to the manual drive force, based on the relationship between the compound value and the compound threshold value.

Figure 9:
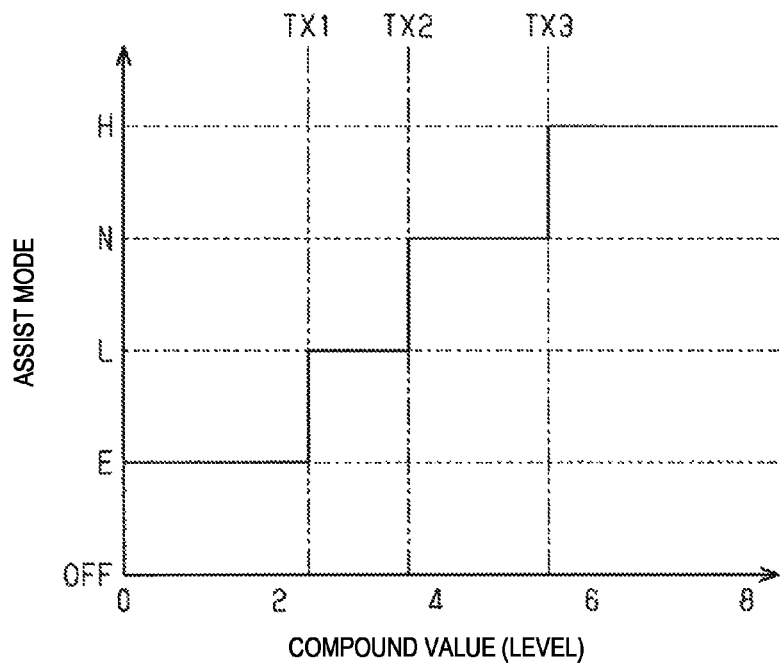
FIG. 9 is a map showing one example of a mode switching condition used by the control device according to a second embodiment.

FIG. 9 shows one example of a third mode switching condition. The third mode switching condition represents the relationship between the compound value and a compound increase threshold value, which is a compound threshold value for increasing the drive force of the motor 12 with respect to the manual drive force. The storage unit 44 (refer to FIG. 2) stores a plurality of compound increase threshold values. For example, plural compound increase threshold values can comprise a first compound increase threshold value TX1, a second compound increase threshold value TX2, and a third compound increase threshold value TX3. In FIG. 9, each of the compound increase threshold values TX1-TX3 is represented by a chained, double-dashed line.

The determination unit 48 (refer to FIG. 2) determines whether a third mode switching condition has been satisfied, based on the relationship between a compound value that is calculated by the control device 40 (refer to FIG. 2) and each of the compound increase threshold values TX1-TX3, as described below.

When the eco-mode is selected, and when the calculated compound value changes from a size that is less than the first compound increase threshold value TX1 to a size that is greater than or equal to the first compound increase threshold value TX1, the determination unit 48 determines that the third mode switching condition has been satisfied, and the control device 40 switches the assist mode from the eco-mode to the low mode.

When the low mode is selected, and when the calculated compound value changes from a size that is less than the second compound increase threshold value TX2 to a size that is greater than or equal to the second compound increase threshold value TX2, the determination unit 48 determines that the third mode switching condition has been satisfied, and the control device 40 switches the assist mode from the low mode to the normal mode.

When the normal mode is selected, and when the calculated compound value changes from a size that is less than the third compound increase threshold value TX3 to a size that is greater than or equal to the third compound increase threshold value TX3, the determination unit 48 determines that the third mode switching condition has been satisfied, and the control device 40 switches the assist mode from the normal mode to the high mode. The method for updating each of the compound increase threshold values TX1-TX3 is substantially the same as the method for updating each of the increase threshold values TU1-TU3.

The fourth mode switching condition represents the relationship between the compound value and a compound decrease threshold value, which is a compound threshold value for decreasing the drive force of the motor 12 with respect to the manual drive force. The storage unit 44 (refer to FIG. 2) stores a plurality of compound decrease threshold values. For example, plural compound decrease threshold values can comprise a first compound decrease threshold value, a second compound decrease threshold value, and a third compound decrease threshold value.

The determination unit 48 determines whether a fourth mode switching condition has been satisfied, based on the relationship between a compound value that is calculated by the control device 40 and each of the compound decrease threshold values. The determination regarding whether the fourth mode switching condition has been satisfied and the method for updating each of the compound decrease threshold values are substantially the same as the determination regarding whether the second mode switching condition has been satisfied and the method for updating each of the decrease threshold values TD1-TD3.

The control device 40 selectively uses the mode switching condition based on the relationship between the gradient information and the threshold value and the mode switching condition based on the relationship between the compound value and the compound threshold value, according to a predetermined rule. For example, the assist mode is switched based on a mode switching condition that is satisfied the earliest.

According to the second embodiment, the following effects can be obtained in addition to the effects of (1)-(4) obtained according to the first embodiment.

(5) According to the bicycle control apparatus, the assist mode is switched based on the relationship between the compound value and the compound threshold value, in addition to the relationship between the gradient information and the threshold value. For this reason, as compared to when switching the assist mode based only on the relationship between the gradient information and the threshold value, the intent of the rider is better reflected in the behavior of the bicycle 10.

Third Embodiment

The bicycle control apparatus according to the third embodiment differs from the bicycle control apparatus according to the first embodiment in the points described below and comprises configurations that are substantially same as the bicycle control apparatus according to the first embodiment in the other points. In the description of the bicycle control apparatus according to the third embodiment, the same reference codes are given to configurations that are shared with the bicycle control apparatus according to the first embodiment, and some or all of the descriptions for those configurations have been omitted.

Figure 10:
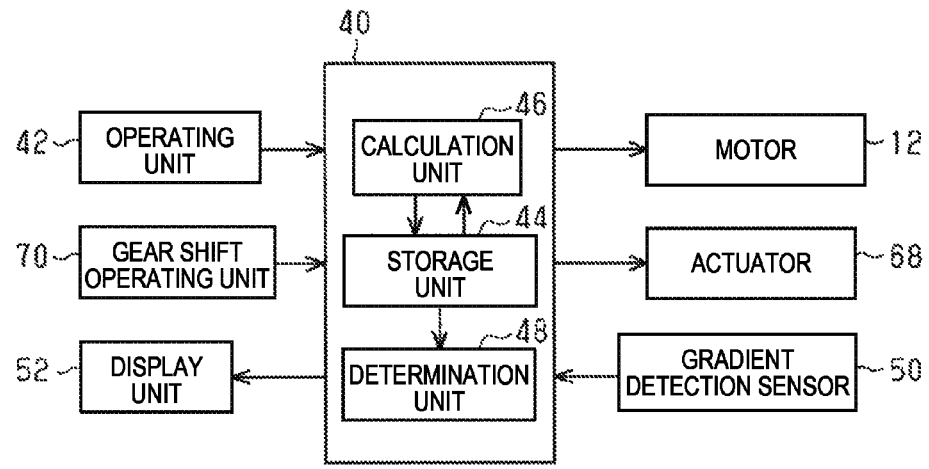
FIG. 10 is a block view of a bicycle that is equipped with a bicycle control apparatus according to a third embodiment.

The bicycle 10 further comprises a transmission (not diagrammed) in which the gear ratio can be changed. The transmission is, for example, an internal transmission or an external transmission that is integrally formed with a hub. As shown in FIG. 10, the transmission comprises an actuator 68 for transmitting a drive force for switching the gear ratio and a planetary gear mechanism (not diagrammed) that is controlled by the actuator 68. The actuator 68 is, for example, an electric motor that switches the gear ratio by controlling the rotation of gears that configure the planetary gear mechanism. The bicycle 10 (refer to FIG. 1) further comprises a gear shift operating unit 70 that outputs an operation signal related to switching the gear ratio to the control device 40.

The control device 40 further comprises an automatic switching function related to the gear ratio and a manual switching function. Same as the first embodiment, the automatic switching function of this embodiment comprises the storage unit 44, the calculation unit 46 and the determination unit 48. The automatic switching function related to the gear ratio is a function to automatically switch the gear ratio, that is, a function to switch the gear ratio independent of a manual operation. The manual switching function is a function to switch the gear ratio based on a manual operation.

An operation of the control device 40, based on the automatic switching function related to the gear ratio, includes an operation to switch the gear ratio based on the relationship between a reference value and a threshold value that is stored in the storage unit 44. The operation of this control device 40 is substantially the same as the operation to switch the assist ratio. The control device 40 stores the reference value when switching the gear ratio, based on the manual operation of the gear changing operating unit 70, to the storage unit 44, updates the threshold value that is stored in the storage unit 44 based on the reference value, and uses the updated threshold value in the automatic switching function related to the gear ratio.

According to this kind of configuration, switching the gear ratio at a time that is expected by the rider when the bicycle 10 is traveling on a slope is facilitated. For this reason, according to a bicycle 10 that is equipped with the control device 40, the intent of the rider is easily reflected in the behavior of the bicycle 10. This contributes to providing a comfortable traveling environment to the rider. The effects (1)-(4) of the first embodiment can also be obtained according to the bicycle control apparatus of the third embodiment.

Modified Examples

The descriptions related to each embodiment are examples of forms that the bicycle control apparatus according to the present invention can take, and they are not intended to limit the forms thereof. The bicycle control apparatus according to the present invention may, in addition to each of the embodiments, take the forms of each modified example of the embodiments described below, as well as forms that combine at least two modified examples that are not mutually contradictory.

According to a modified example of the first embodiment or the third embodiment, the bicycle 10 comprises a wind force sensor that detects the wind force, which is an example of the reference value, instead of the gradient detection sensor 50. The wind force sensor is attached, for example, to the frame 14 or the handle 12 and outputs wind force information, which is information regarding the detected wind force, to the control device 40. The wind force information includes a value indicative of the wind force.

The control device 40 switches the assist mode based on the relationship between the wind force information and the threshold value. If the assist mode is switched based on a manual operation, the control device 40 stores the data regarding the wind force information when the assist mode is switched to the storage unit 44 and updates the threshold value according to a prescribed update method, based on the wind force information.

According to yet another example of the modified example described above, the bicycle 10 comprises both a gradient detection sensor 50 and a wind force sensor. The control device 40 selectively uses the mode switching condition based on the relationship between the gradient information and the threshold value, as well as the mode switching condition based on the relationship between the wind force information and the threshold value, according to a predetermined rule. For example, the assist mode is switched based on a mode switching condition that is satisfied the earliest.

The bicycle 10 comprises a magnetic sensor for detecting the rotational angle of the front wheel 16 or the rear wheel 18 instead of the gradient detection sensor 50. The bicycle 10 further comprises a magnet that is attached to the spoke of the wheel. The magnetic sensor is attached to the frame 14. The magnetic sensor outputs the angle information, which is information related to the rotational angle of the front wheel 16 or the rear wheel 18, or the speed information, which is information related to the rotational speed of the front wheel 16 or the rear wheel 18, to the control device 40.

The control device 40 obtains the distance information, which is information related to the travel distance of the bicycle 10, based on the angle information or the speed information. The distance information is one example of the reference value and includes a value indicative of the travel distance of the bicycle 10. The control device 40 switches the assist mode based on the relationship between the distance information and the threshold value. If the assist mode is switched based on a manual operation, the control device 40 stores the data regarding the distance information when the assist mode is switched to the storage unit 44 and updates the threshold value according to a prescribed update method, based on the distance information.

According to yet another example of the modified example described above, the bicycle 10 comprises both a gradient detection sensor 50 and a magnetic sensor. The control device 40 selectively uses the mode switching condition based on the relationship between the gradient information and the threshold value, as well as the mode switching condition based on the relationship between the distance information and the threshold value, according to a predetermined rule. For example, the assist mode is switched based on a mode switching condition that is satisfied the earliest.

The bicycle 10 comprises a load sensor instead of the gradient detection sensor 50 in which the load sensor is configured to detect a bicycle load weight that is a load mounted on the bicycle 10. The bicycle load weight is another example of the reference value, instead of the gradient detection sensor 50. The load sensor is attached to, for example, a basket or a carrier of the bicycle 10. The load sensor outputs the weight information, which is information regarding the detected load weight, to the control device 40. The weight information includes a value indicative of the bicycle load weight.

The control device 40 switches the assist mode based on the relationship between the weight information and the threshold value. If the assist mode is switched based on a manual operation, the control device 40 stores the data regarding the weight information when the assist mode is switched to the storage unit 44 and updates the threshold value according to a prescribed update method, based on the weight information.

According to yet another example of the modified example described above, the bicycle 10 comprises both a gradient detection sensor 50 and a load sensor. The control device 40 selectively uses the mode switching condition based on the relationship between the gradient information and the threshold value, as well as the mode switching condition based on the relationship between the weight information and the threshold value, according to a predetermined rule. For example, the assist mode is switched based on a mode switching condition that is satisfied the earliest.

The bicycle 10 comprises a load sensor for detecting the manual drive force, which is one example of the reference value, instead of the gradient detection sensor 50. The load sensor is attached to, for example, the pedal 30 or the crank arm 26 and outputs the manual force information, which is information regarding the detected manual drive force, to the control device 40. The manual force information includes a value indicative of the manual drive force.

The control device 40 switches the assist mode based on the relationship between the manual force information and the threshold value. If the assist mode is switched based on a manual operation, the control device 40 stores the data regarding the manual force information when the assist mode is switched to the storage unit 44 and updates the threshold value according to a prescribed update method, based on the manual force information.

According to yet another example of the modified example described above, the bicycle 10 comprises both a gradient detection sensor 50 and a load sensor. The control device 40 selectively uses the mode switching condition based on the relationship between the gradient information and the threshold value, as well as the mode switching condition based on the relationship between the manual force information and the threshold value, according to a predetermined rule. For example, the assist mode is switched based on a mode switching condition that is satisfied the earliest.

The bicycle 10 comprises a plurality of sensors for detecting information related to the resistance of the road surface, which is one example of the reference value, instead of the gradient detection sensor 50. The plurality of sensors includes, for example, a load sensor for detecting the manual drive force and a rotational speed sensor for detecting the rotational speed of the crankshaft 28. The rotational speed sensor outputs information related to the rotational speed of the crankshaft 28 to the control device 40.

The control device 40 obtains the resistance information, which is information related to the resistance of the road surface, based on information that can be obtained from each of the sensors described above. The resistance information is one example of the reference value and includes a value indicative of the resistance of the road surface. The control device 40 switches the assist mode based on the relationship between the resistance information and the threshold value. If the assist mode is switched based on a manual operation, the control device 40 stores the data regarding the resistance information when the assist mode is switched to the storage unit 44 and updates the threshold value according to a prescribed update method, based on the resistance information.

According to yet another example of the modified example described above, the bicycle 10 comprises a gradient detection sensor 50, a load sensor, and a rotational speed sensor. The control device 40 selectively uses the mode switching condition based on the relationship between the gradient information and the threshold value, as well as the mode switching condition based on the relationship between the resistance information and the threshold value, according to a predetermined rule. For example, the assist mode is switched based on a mode switching condition that is satisfied the earliest.

The bicycle 10 comprises an acceleration sensor for detecting the acceleration of the bicycle 10 in the traveling direction, which is one example of the reference value, instead of the gradient detection sensor 50. The acceleration sensor is attached, for example, on the frame 14 and outputs acceleration information, which is information regarding the detected acceleration, to the control device 40. The acceleration information includes a value indicative of the acceleration of the bicycle 10.

The control device 40 switches the assist mode based on the relationship between the acceleration information and the threshold value. If the assist mode is switched based on a manual operation, the control device 40 stores the data regarding the acceleration information when the assist mode is switched to the storage unit 44 and updates the threshold value according to a prescribed update method, based on the acceleration information.

According to yet another example of the modified example described above, the bicycle 10 comprises both a gradient detection sensor 50 and an acceleration sensor. The control device 40 selectively uses the mode switching condition based on the relationship between the gradient information and the threshold value, as well as the mode switching condition based on the relationship between the acceleration information and the threshold value, according to a predetermined rule. For example, the assist mode is switched based on a mode switching condition that is satisfied the earliest.

According to a modified example of the second embodiment, the determination unit 48 determines whether a mode switching condition has been satisfied based only on the relationship between the level of the compound value and each of the compound increase threshold values TX1-TX3, as well as each of the compound decrease threshold values.

According to a modified example of the second embodiment, the compound value is information that combines at least two of the following: the gradient information, the wind force information, the distance information, the weight information, the manual force information, the resistance information, and the acceleration information.

According to a modified example of the third embodiment, the control device 40 automatically switches only the gear ratio based on the relationship between the reference value and the stored threshold value.

According to the modified example of the third embodiment, the motor 12, the operating unit 42, and the display unit 52 may be omitted from the bicycle 10.

The contents of the plurality of assist modes may be arbitrarily changed.

The control device 40 switches the assist mode based on the relationship between a plurality of types of reference values and a plurality of threshold values that correspond to each of the reference values. The plurality of reference values are at least two of the reference values that correspond to the following: the gradient information, the wind force information, the distance information, the weight information, the manual force information, the resistance information, and the acceleration information. In this case, the control device 40 switches the assist mode using a threshold value with which the mode switching condition is most quickly satisfied.

The control device 40 determines whether or not the variation in the gradient is within a prescribed range when the assist mode is switched based on a manual operation. If the variation in the gradient is within a prescribed range, the control device 40 stores the gradient information in the storage unit 44. If the variation in the gradient is not within a prescribed range from when the assist mode is switched to when a prescribed time has elapsed, the control device 40 does not store the gradient information at the time of switching the assist mode to the storage unit 44. According to this configuration, when the variation in the gradient is large, the gradient information is less likely to be used to update the threshold value.

The control device 40 updates the threshold value based on the reference value when the travel distance of the bicycle 10 reaches a prescribed travel distance, even if the total amount of data at the time of mode switching has not reached a prescribed amount. According to this configuration, the gradient information is able to update the threshold value, even if the number times that the rider has operated the operating unit 42 is small.

The control device 40 sets the specific reference value to the new threshold value.

The control device 40 sets a new threshold value based on data related to one piece of gradient information when switching the assist mode based on a manual operation.

The control device 40 updates the threshold value each time the assist mode is switched based on a manual operation.

The front sprocket 34 is coupled so as not to rotate relative to the crankshaft 28. In this case, the bicycle 10 may take a form comprising a coaster brake in a hub of the rear wheel 18.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A bicycle control apparatus comprising:
    a memory device; and
    a control device programmed with
        an automatic switching function for automatically switching an assist ratio, which is a ratio of a manual drive force to a drive force of an electric assist motor, based on a relationship between a threshold value that is stored and a reference value that is indicative of one of a bicycle traveling environment and a bicycle traveling state, and
        a manual switching function for switching the assist ratio based on a manual operation,
        the control device being further programmed to update the threshold value is updated based on the reference value when switching the assist ratio by the manual switching function.

2. The bicycle control apparatus as recited in claim 1, wherein
    the reference value is a value indicative of a road surface gradient.

3. The bicycle control apparatus as recited in claim 1, wherein
    the reference value is a value indicative of wind force.

4. The bicycle control apparatus as recited in claim 1, wherein
    the reference value is a value indicative of resistance of a road surface.

5. The bicycle control apparatus as recited in claim 1, wherein
    the reference value is a value indicative of a bicycle travel distance.

6. The bicycle control apparatus as recited in claim 1, wherein
    the reference value is a value indicative of a bicycle load weight.

7. The bicycle control apparatus as recited in claim 1, wherein
    the reference value is a value indicative of the manual drive force.

8. The bicycle control apparatus as recited in claim 1, wherein
    the automatic switching function of the control device programmed is to automatically switch the assist ratio based on a relationship between a plurality of types of reference values and a plurality of threshold values that correspond to each of the reference values, and the plurality of types of reference values comprise at least two of the following: a value indicative of a road surface gradient, a value indicative of wind force, a value indicative of a resistance of a road surface, a value indicative of a bicycle travel distance, a value indicative of a bicycle load weight, and a value indicative of the manual drive force.

9. The bicycle control apparatus as recited in claim 1, wherein
    the automatic switching function of the control device programmed is to use an increase threshold value as the threshold value for switching the assist ratio when the drive force of the electric assist motor is increased with respect to the manual drive force, the increase threshold value is updated based on the reference value when switching the assist ratio by the manual switching function so that the drive force of the electric assist motor is increased with respect to the manual drive force, and
    the automatic switching function of the control device programmed is to use a decrease threshold value as the threshold value for switching the assist ratio when the drive force of the electric assist motor is decreased with respect to the manual drive force, the decrease threshold value is updated based on the reference value when switching the assist ratio by the manual switching function so that the drive force of the electric assist motor is decreased with respect to the manual drive force.

10. The bicycle control apparatus as recited in claim 1, wherein
    the reference value is stored each time the assist ratio is switched by the manual switching function, and the threshold value is updated based on a plurality of the reference values that are stored.

11. The bicycle control apparatus as recited in claim 10, wherein
the reference values excludes singular points in the plurality of the reference values that are stored and used for updating the threshold value.

12. The bicycle control apparatus as recited in claim 10, wherein
the automatic switching function of the control device programmed is to use a specific reference value as the reference value at which the assist ratio is estimated as likely to be switched by the manual switching function, the specific reference value is specified based on the plurality of the reference values, and the threshold value is updated based on the specific reference value.

13. The bicycle control apparatus as recited in claim 12, wherein
the increase threshold value is set in an area in which a bicycle load weight is low, within an area of the reference value that is specified by the specific reference value.

14. The bicycle control apparatus as recited in claim 12, wherein
the decrease threshold value is set in an area in which a bicycle load weight is high, within an area of the reference value that is specified by the specific reference value.

15. The bicycle control apparatus as recited in claim 1, wherein
the control device is further programmed is to use a plurality of types of the reference values, and
the reference value is stored each time the assist ratio is switched by the manual switching function,
the automatic switching function of the control device programmed is to use a specific reference value as the reference value at which the assist ratio is estimated as likely to be switched by the manual switching function, the specific reference value is determined based on the plurality of the reference values for each of the plurality of types of the reference values, and
the plurality of the threshold values that correspond to each of the plurality of types of reference values are updated based on the specific reference value that corresponds to that type of reference value.

16. The bicycle control apparatus as recited in claim 1, wherein
the control device is further programmed is to use a plurality of types of the reference values, and
the automatic switching function of the control device programmed is to switch the assist ratio using the threshold value with which a mode switching condition for switching the assist mode is estimated to be most quickly satisfied, from among the plurality of the threshold values that correspond to each of the plurality of types of the reference values.

17. The bicycle control apparatus as recited in claim 1, wherein
the control device is further programmed is to use a plurality of types of the reference values, and
the automatic switching function of the control device programmed is to determine a compound value by combining the plurality of types of the reference values, and the assist ratio is switched based on a relationship between a stored compound threshold value and the compound value.

18. The bicycle control apparatus as recited in claim 1, wherein
the threshold value is updated based on the reference value when variability in the reference value over a period, from when the assist ratio is switched by the manual switching function to when a prescribed time has elapsed, is within a prescribed range.

19. The bicycle control apparatus as recited in claim 1, wherein
the threshold value is updated based on the reference value when a bicycle travel distance has reached a prescribed travel distance.

20. A bicycle control apparatus comprising:
a memory device; and
a control device programmed with
an automatic switching function for automatically switching a gear ratio of a transmission based on a relationship between a stored threshold value and a reference value that is indicative of one of a bicycle traveling environment and a bicycle traveling state, and
a manual switching function for switching the gear ratio based on a manual operation,
the control device being further programmed to update the threshold value based on the reference value when switching the gear ratio by the manual switching function, and the reference value comprises at least one of: a value indicative of a road surface gradient, a value indicative of wind force, a value indicative of resistance of the road surface, a value indicative of the bicycle travel distance, a value indicative of a bicycle load weight, and a value indicative of the manual drive force.

* * * * *